(12) United States Patent
Sollenberger et al.

(10) Patent No.: US 9,014,740 B2
(45) Date of Patent: Apr. 21, 2015

(54) ENHANCED MULTIPLE SIM TIME TRACKING

(75) Inventors: Nelson Sollenberger, St Thomas, PA (US); Wei Luo, Marlboro, NJ (US); Xiao-Feng Qi, Westfield, NJ (US); Kaiping Li, Randolph, NJ (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 13/481,692

(22) Filed: May 25, 2012

(65) Prior Publication Data

US 2013/0150112 A1   Jun. 13, 2013

Related U.S. Application Data

(60) Provisional application No. 61/569,621, filed on Dec. 12, 2011, provisional application No. 61/587,521, filed on Jan. 17, 2012, provisional application No. 61/595,546, filed on Feb. 6, 2012.

(51) Int. Cl.
*H04W 56/00* (2009.01)
*H04W 48/16* (2009.01)
*H04W 88/06* (2009.01)
*H04W 52/02* (2009.01)
*H04W 76/04* (2009.01)

(52) U.S. Cl.
CPC ...... *H04W 56/0015* (2013.01); *H04W 52/0216* (2013.01); *H04W 76/048* (2013.01); *H04W 88/06* (2013.01)

(58) Field of Classification Search
CPC ...... H04W 56/00; H04W 48/16; H04W 88/06
See application file for complete search history.

(56) References Cited

U.S. PATENT DOCUMENTS

| 2007/0266256 | A1* | 11/2007 | Shah et al. .................... 713/178 |
| 2010/0113014 | A1* | 5/2010 | Neumann et al. .......... 455/426.1 |
| 2012/0063524 | A1* | 3/2012 | Stott et al. ..................... 375/259 |
| 2012/0108273 | A1* | 5/2012 | Lee et al. ..................... 455/458 |
| 2013/0090137 | A1* | 4/2013 | Krishnamoorthy et al. .. 455/458 |

FOREIGN PATENT DOCUMENTS

| WO | WO2011/059521 A1 | 5/2011 |
| WO | WO2012/150135 A1 | 11/2012 |
| WO | WO 2012150135 A1 * | 11/2012 |

OTHER PUBLICATIONS

European Search Report, App. No. 12008035.3-1852, dated Mar. 26, 2013.

* cited by examiner

*Primary Examiner* — Edward Urban
*Assistant Examiner* — Ralph H Justus
(74) *Attorney, Agent, or Firm* — Brinks Gilson & Lione

(57) ABSTRACT

A technique for time tracking helps a mobile communication device with multiple SIMs to more accurately maintain synchronization with a base station. By utilizing synchronization information from both SIMs, the technique is able to more frequently and more accurately adjust timing information for each SIM. As a result, the mobile communication device exhibits an increased ability to accurately synchronize without the need for a higher precision reference or increased power consumption.

20 Claims, 11 Drawing Sheets

ENHANCED MULTIPLE SIM TIME TRACKING

1. PRIORITY CLAIM

This application claims the benefit of priority to the following U.S. provisional patent applications:
U.S. Patent Application No. 61/569,621, filed 12 Dec. 2011;
U.S. Patent Application No. 61/587,521, filed 17 Jan. 2012; and
U.S. Patent Application No. 61/595,546, filed 6 Feb. 2012.

2. TECHNICAL FIELD

This disclosure relates to communication devices with multiple Subscriber Identity Modules (SIMs). The disclosure also relates to enhanced time tracking in communication devices with multiple SIMs.

3. BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Relatively recently, cellular phone manufactures have introduced phone designs that include multiple SIM cards. Each SIM card facilitates a separate connection to the same network or different networks. As a result, the SIMs provide the owner of the phone with, for example, two different phone numbers handled by the same phone hardware. Accordingly, the multiple SIM approach alleviates to some degree the need to carry different physical phones, and improvements in multiple SIM communication devices will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to user equipment. User equipment may take many different forms and have many different functions. As one example, user equipment may be a cellular phone capable of making and receiving wireless phone calls. The user equipment may also be a smartphone that, in addition to making and receiving phone calls, runs general purpose applications. User equipment may be virtually any device that wirelessly connects to a network, including as additional examples a driver assistance module in a vehicle, an emergency transponder, a pager, a satellite television receiver, a networked stereo receiver, a computer system, music player, or virtually any other device. The discussion below addresses how to track symbol timing in user equipment that includes multiple (e.g., two) SIMs.

Figure 1:
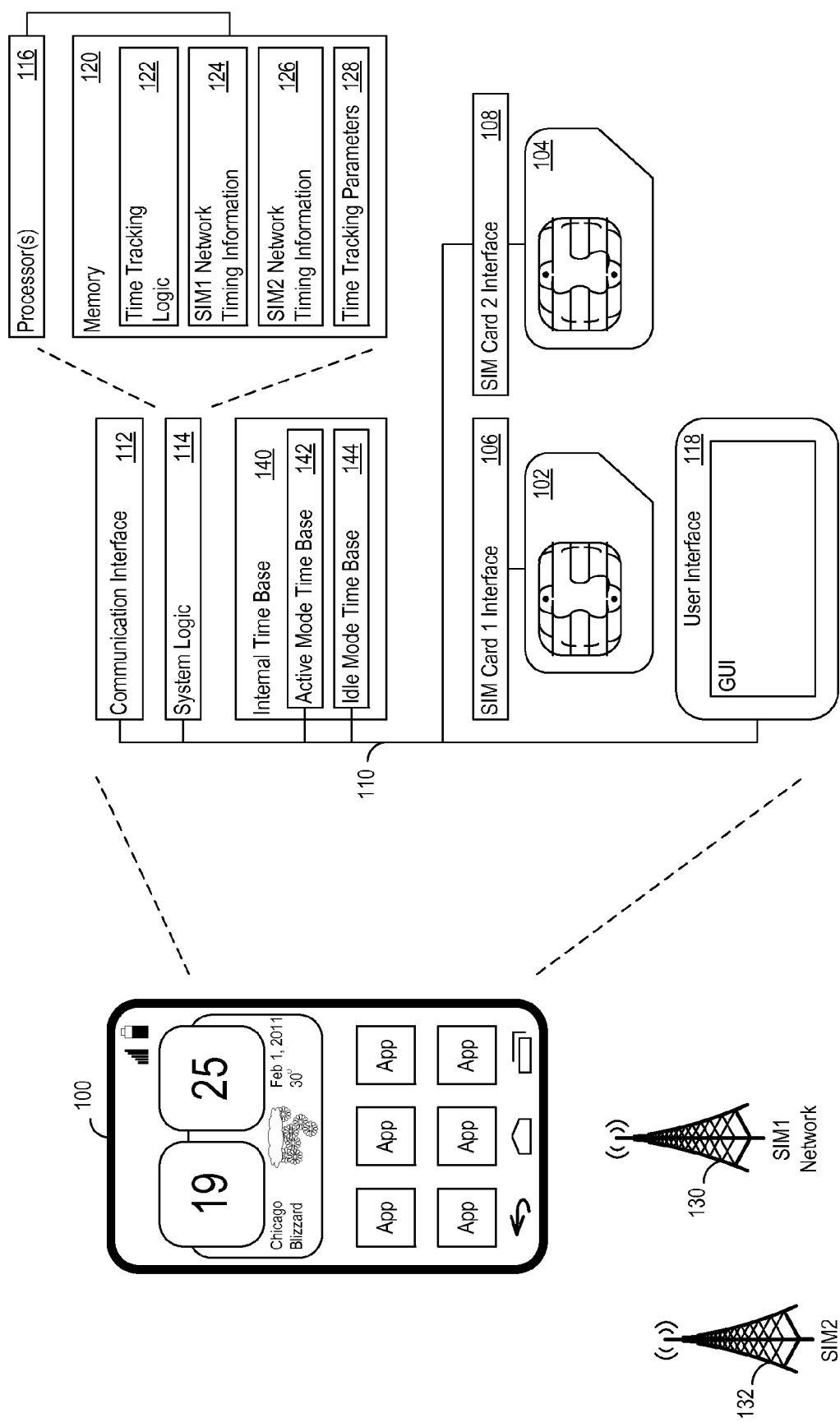
FIG. 1 shows an example of user equipment with multiple SIMs.

FIG. 1 shows an example of user equipment 100 with multiple SIMs, in this example the SIM1 102 and the SIM2 104. An electrical and physical interface 106 connects SIM1 102 to the rest of the user equipment hardware, for example, to the system bus 110. Similarly, the electrical and physical interface 108 connects the SIM2 to the system bus 110.

The user equipment 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the user equipment. In that regard, the system logic 114 may include logic that facilitates, as examples, running applications, accepting user inputs, saving and retrieving application data, establishing, maintaining, and terminating cellular phone calls, wireless network connections, Bluetooth connections, or other connections, and displaying relevant information on the user interface 118. The user interface 118 may include a graphical user interface, touch sensitive display, voice or facial recognition inputs, buttons, switches, and other user interface elements.

The communication interface 112 may include one or more transceivers. The transceivers may be wireless transceivers that include modulation/demodulation circuitry, amplifiers, analog to digital and digital to analog converters and/or other logic for transmitting and receiving through one or more antennas, or through a physical (e.g., wireline) medium. As one implementation example, the communication interface 112 and system logic 114 may include a BCM2091 EDGE/

HSPA Multi-Mode, Multi-Band Cellular Transceiver and a BCM59056 advanced power management unit (PMU), controlled by a BCM28150 HSPA+ system-on-a-chip (SoC) baseband smartphone processer. These integrated circuits, as well as other hardware and software implementation options for the user equipment 100, are available from Broadcom Corporation of Irvine Calif.

The transmitted and received signals may adhere to any of a diverse array of formats, protocols, modulations, frequency channels, bit rates, and encodings that presently or in the future support communications including paging notifications associated with SIMs. As one specific example, the communication interface 112 may support transmission and reception under the Universal Mobile Telecommunications System (UMTS). The techniques described below, however, are applicable to other communications technologies that include paging whether arising from the 3rd Generation Partnership Project (3GPP), GSM (R) Association, Long Term Evolution (LTE)™ efforts, or other partnerships or standards bodies.

In order for user equipment 100 to reliably transmit and receive data over a network, user equipment 100 may synchronize its internal timing with the timing of a base transceiver station (BTS) on the network. User equipment 100 may synchronize with the timing from a BTS of the network by aligning an internal time base 140 of the user equipment 100 with the timing information received from the BTS. In order to assist with synchronization, the BTS may periodically send timing information to the user equipment 100 so that the user equipment 100 can correct its internal time base 140. In order to receive the timing information, the user equipment 100 may actively listen on the synchronization channel or may periodically listen on the paging channel.

The user equipment 100 may connect with a network in either active mode or idle mode. When user equipment 100 connects to a network in active mode, user equipment 100 is in frequent communication with the network and frequently receives timing information from the network. When the network connection is in idle mode, the user equipment 100 can remain in a reduced power "sleep" mode, "waking up" periodically to listen for synchronization information contained on the paging channel of the network. User equipment 100 may utilize multiple internal time bases, including, for example, an active mode time base 142 and an idle mode time base 144. The active mode time base 142 may be more accurate than the idle mode time base 144. The active mode time base 142 may be used while the user equipment is connected to a network in active mode and actively transmitting/receiving data. User equipment 100 may have an idle mode time base 144 that is used when user equipment 100 is connected to the network in idle mode and not actively transmitting/receiving data. User equipment 100 may use idle mode time base 142 to determine the particular time that user equipment 100 should wake up from sleep mode. Due to the fact that the active mode time base 142 may be more accurate and may consume additional power, the user equipment 100 may, while in sleep mode, power down the active mode time base 142.

During periods when user equipment 100 is in sleep mode and does not receive timing information from the BTS, user equipment 100 may rely on its internal time base 140. However, internal time base 140 may be inaccurate and may "drift" with respect to the timing of the BTS. The time drift may be due to phase error or frequency error with respect to the phase and/or frequency of the BTS. If user equipment 100 does not periodically wake up to listen for the synchronization information contained in the paging block from the network, the user equipment 100 may lose synchronization with the network. As a result, the user equipment 100 may not receive a paging indicator from the network and may miss a call, message, or data that the network has designated for the user equipment 100.

When in idle mode, user equipment 100 may be scheduled to wake up at a specified interval to receive the synchronization information contained in the paging block from the network. The specified interval may be based on a background paging schedule (BPS). As one example of the background paging schedule, the network's discontinuous reception cycle (DRX) interval may be used as the background paging schedule. The BPS provides the length of time specified by the network during which the user equipment 100 remains asleep between periods of listening for the synchronization information contained in the paging block. The length of time for the BPS may vary, depending on the type of communication technology used (e.g., GSM, CDMA, UMTS, etc.) and the particular settings used by the particular service provider that operates the network. As one example for one network, the BPS may be 2 seconds, while for other networks, the BPS may be shorter or longer.

Figure 2:
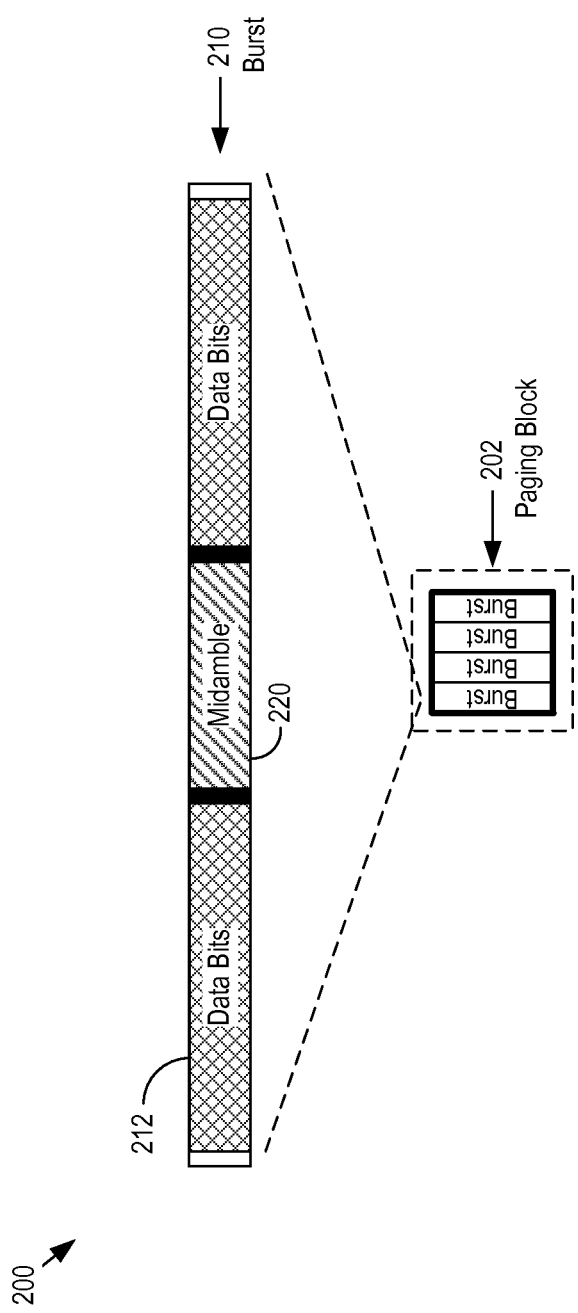
FIG. 2 shows an example of a paging block and the bits of the paging block.

Synchronization information from the network may be contained in a paging block sent from the BTS to the user equipment 100 on the paging channel. FIG. 2 shows an example of paging block 202. Paging block 202 may contain bursts of data in the paging block. For example, the burst 210 is contained in the paging block 202. Burst 210 includes data bits 212 and midamble 220. The midamble is a known sequence of bits, such as a training sequence, that may be contained in each burst of paging block 202. Midamble 220 can be used for synchronization because the midamble arrives at a known location within each burst. When the user equipment 100 identifies and locates the midamble, the user equipment 100 can identify the start position and/or stop position of the data burst.

Figure 3:
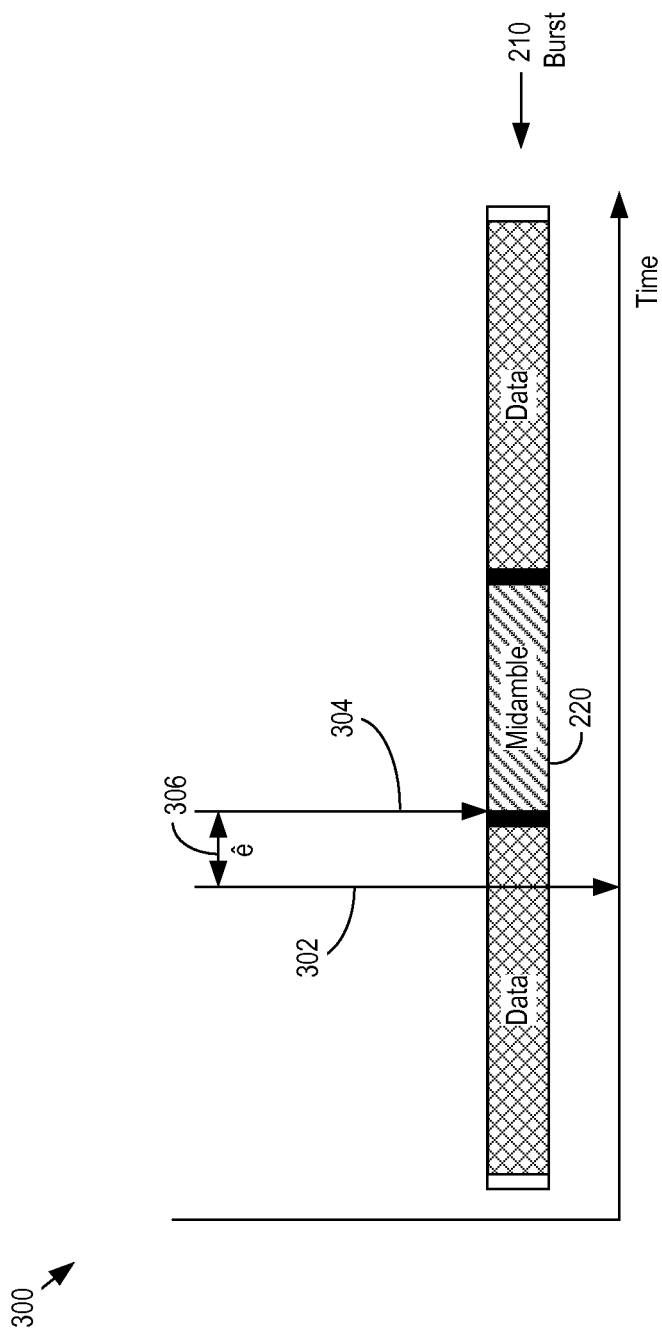
FIG. 3 shows an example of determining timing error using the paging block.

FIG. 3 shows an example of using midamble 220 to determine a timing error 306. The user equipment 100 may use its internal time base 140 to predict the arrival of midamble 220 at predicted arrival time 302. Once the user equipment 100 identifies midamble 220, the user equipment 100 identifies the actual arrival time 304 of midamble 220. The time difference between the predicted arrival time 302 and actual arrival time 304 results in the timing error 306. User equipment 100 may use timing error 306 to compensate the internal time base 140 when predicting the arrival time of the next paging block.

In order to predict the arrival time of the next paging block, user equipment 100 may use a time tracking loop. The time tracking loop may correct for the drift in the internal time base 140. The time tracking loop may apply a correction factor to account for the timing drift of the internal time base 140. The correction factor may be updated each time user equipment 100 receives a paging block and determines timing error 306 from the burst.

Where a user equipment has multiple SIMs for connecting to multiple networks, the user equipment may require synchronization with multiple BTS's on multiple networks. Each network (e.g., network 130 or 132) may supply its own timing information, and the BPS may have a different time period for each network. User equipment 100 may track the timing difference that may exist between the user equipment's internal time base 140 and the timing for each network. As a result, the user equipment 100 may apply a different correction factor for each network with which it is synchronized. As will be described in more detail below, user equipment 100 may use the timing information received from one network, either network, or both networks when tracking the timing correction factor for the user equipment 100.

In some implementations, user equipment 100 may share radio frequency resources between multiple SIMs. As a result, both SIMs cannot simultaneously receive paging blocks from the network. Because both SIMs may not simultaneously receive paging blocks from the network, in situations, for example, where user equipment 100 is scheduled to receive a paging block from SIM1 network 130 at the same time user equipment 100 is scheduled to be receive a paging block from SIM2 network 132, the paging blocks "collide." When the paging blocks from multiple networks collide, user equipment 100 may choose whether to receive the paging block from SIM1 network 130, SIM2 network 132, or neither. As a result, one or both paging blocks may be ignored or lost. If user equipment 100 ignores or loses a paging block, user equipment may wait for the next scheduled paging block.

Figure 4:
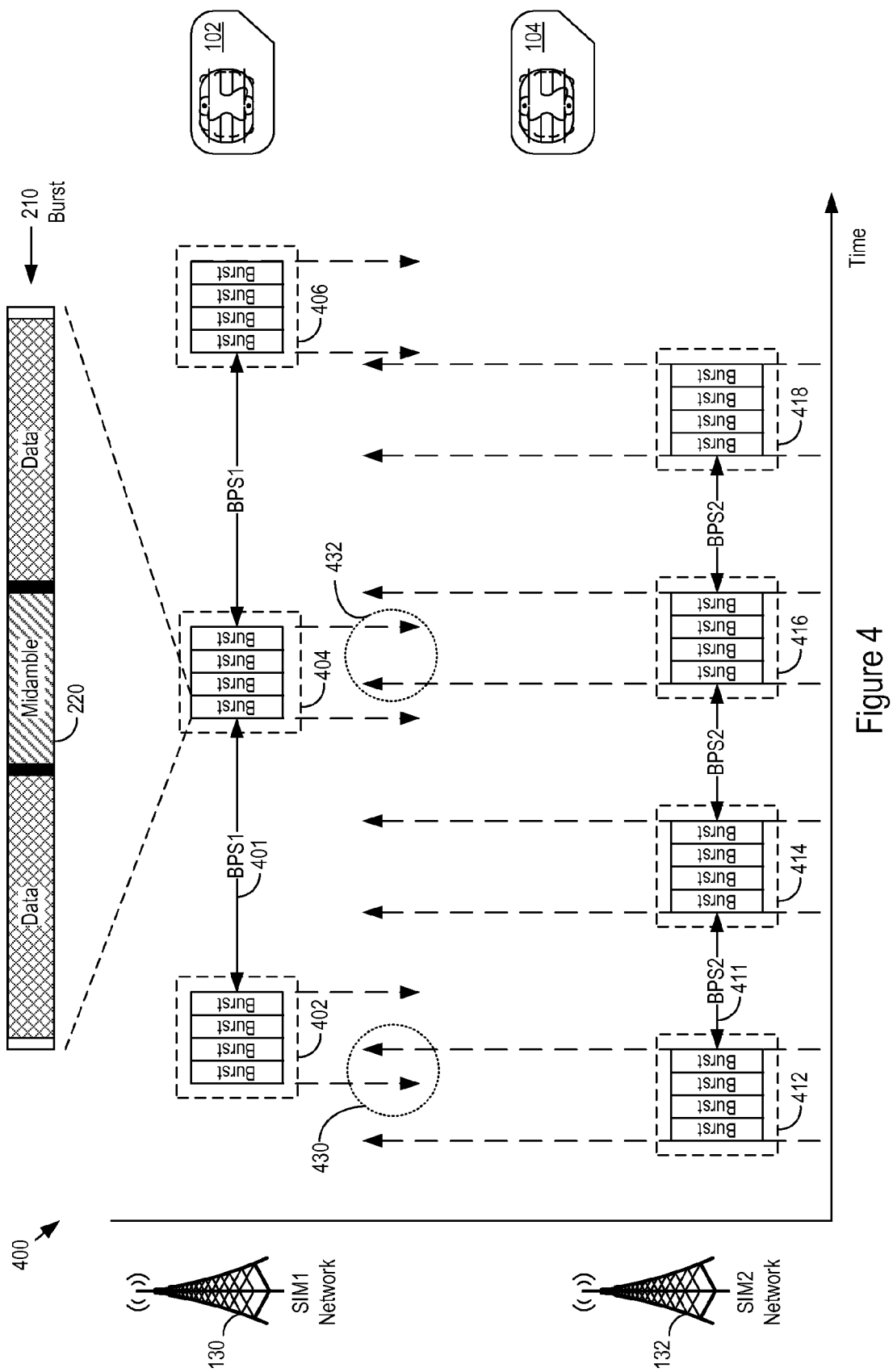
FIG. 4 shows an example of user equipment including multiple SIMS where the scheduled reception of paging blocks for each SIM may collide.

FIG. 4 shows an example of "collisions" between paging blocks from multiple networks. Timing graph 400 shows a schedule of paging blocks from SIM1 network 130 and SIM2 network 132 that are designated for user equipment 100. Paging blocks 402, 404, and 406 are scheduled by SIM1 network 130 at BPS1 time interval 401. Paging blocks 412, 414, 416 are scheduled by SIM2 network 132 at BPS2 time interval 411. Based on the schedule, paging block 402 and paging block 412 are scheduled to arrive at user equipment 100 in a partially overlapping manner, indicated by timing overlap 420. Because paging block 402 and paging block 412 are scheduled to collide (i.e., overlap), user equipment 100 may choose to receive paging block 402, paging block 412, or neither. Similarly, paging block 404 and paging block 416 are scheduled to arrive at user equipment 100 at the same time, indicated by timing overlap 432. Because paging block 404 and paging block 416 are scheduled to collide, user equipment 100 may choose to receive paging block 404, paging block 416, or neither. As a result of the collisions, user equipment 100 may lose opportunities to receive timing information from either SIM1 network 130 or SIM2 network 132. When paging blocks collide and user equipment 100 waits for additional paging blocks, the internal time base may drift further out of synchronization with the network. As a result of lost paging blocks, user equipment 100 may not be able to update the timing correction factor as frequently as desired. Thus, the user equipment may lose synchronization between the user equipment 100 and network 130 or 132. System logic 114 provides certain advantages.

In one implementation, the system logic 114 includes one or more processors 116 and a memory 120. The memory 120 stores, for example, time tracking logic 122 that the processor 116 executes. The memory 120 may also store SIM1 network timing information 124, SIM2 network timing information 126, and time tracking parameters 128. As will be described in more detail below, the time tracking logic 122 facilitates timing correction so that user equipment 100 can more accurately synchronize with each network, even when some paging blocks collide.

The time tracking logic 122 may independently track the drift of internal time base 140 for each network with which user equipment 100 is connected. The time tracking logic 122 may independently track the time base drift by having independent tracking loops for each network. For example, if user equipment 100 is connected in idle mode to SIM1 network 130, the time tracking logic 122 may use the timing error determined from paging blocks received from SIM1 network 130. Using the timing error from paging blocks received from SIM1 network 130, the time tracking logic 122 may apply an appropriate correction factor to the internal time base 140.

Similarly, if user equipment 100 is connected in idle mode to SIM2 network 132, the time tracking logic 122 may use the timing error determined from paging blocks received from SIM2 network 132. Using the timing error from paging blocks received from SIM2 network 132, the time tracking logic 122 may apply an appropriate correction factor to the internal time base 140.

In another implementation, the time tracking logic 124 may track the drift of internal time base 140 by combining—into a single tracking loop—the timing error determined from paging blocks received from the multiple networks with which user equipment 100 may be connected. For example, if user equipment 100 is connected to SIM1 network 130 and SIM2 network 132, the time tracking logic 122 may use the SIM1 network paging blocks and SIM2 network paging blocks in order to determine the appropriate time base compensation for synchronizing user equipment 100 with SIM1 network 130 and SIM2 network 132. In particular, by combining the timing error determined from paging blocks received from multiple networks, the user equipment is able to take advantage of timing information received from both networks in order to more frequently update the timing compensation and more accurately synchronize the timing of the user equipment 100 to the timing of the network, even when some paging blocks collide and/or are lost.

The time tracking logic 122 may use certain time tracking parameters 128 in order to utilize timing error determined from paging blocks received from multiple networks for improved time tracking. The time tracking logic 122 may store the time tracking parameters 128 in memory 120 and update the time tracking parameters 128 as the processor 116 calculates and processes the timing information. For example, when user equipment 100 is in idle mode, each time a paging block is received from SIM1 network 130 or SIM2 network 132, the time tracking logic 122 may update the time tracking parameters 128.

In one implementation, example time tracking parameters 128 may include:

TABLE 1

| Variable | Parameter Type | Description |
| --- | --- | --- |
| $\alpha_1$ | constant | Gain of the first order phase locked loop. This constant may be used to stabilize the loop and may be set to a rational number less than one |
| $\alpha_d$ | constant | Gain of the "delta loop." This constant may be used to stabilize the loop and may be set to a rational number less than one |
| n | index | An index representing receipt of the current paging block; n + 1 is the next scheduled paging block |
| i(n) | input | Network Identification (e.g., SIM1 network or SIM2 network) for the n-th paging block |
| ê(n) | input | The measured timing error from the n-th paging block |
| c | internal state variable | First order loop filter output, representing the timing adjustment due to phase error |
| d | internal state variable | The differential adjustment applied when the next scheduled paging block is from a different network |
| δ | internal variable | Timing adjustment between the previous paging block and the current paging block |

In one implementation, using the time tracking parameters 128 listed above, the time tracking logic 122 may implement the following algorithm:

TABLE 2

```
for n = 1,2, ...
    % calculate loop filter output (phase error timing adjustment)
    c = α₁ê(n);
    % update differential adjustment
    d = d + (-1)^i(n) α_d c;
    % determine time base adjustment based on phase timing error
    if       i(n + 1) == i(n)    then  δ = c;
    elseif   i(n + 1) == 1       then  δ = c – d;
    elseif   i(n + 1) == 2       then  δ = c + d;
end
```

Figure 5:
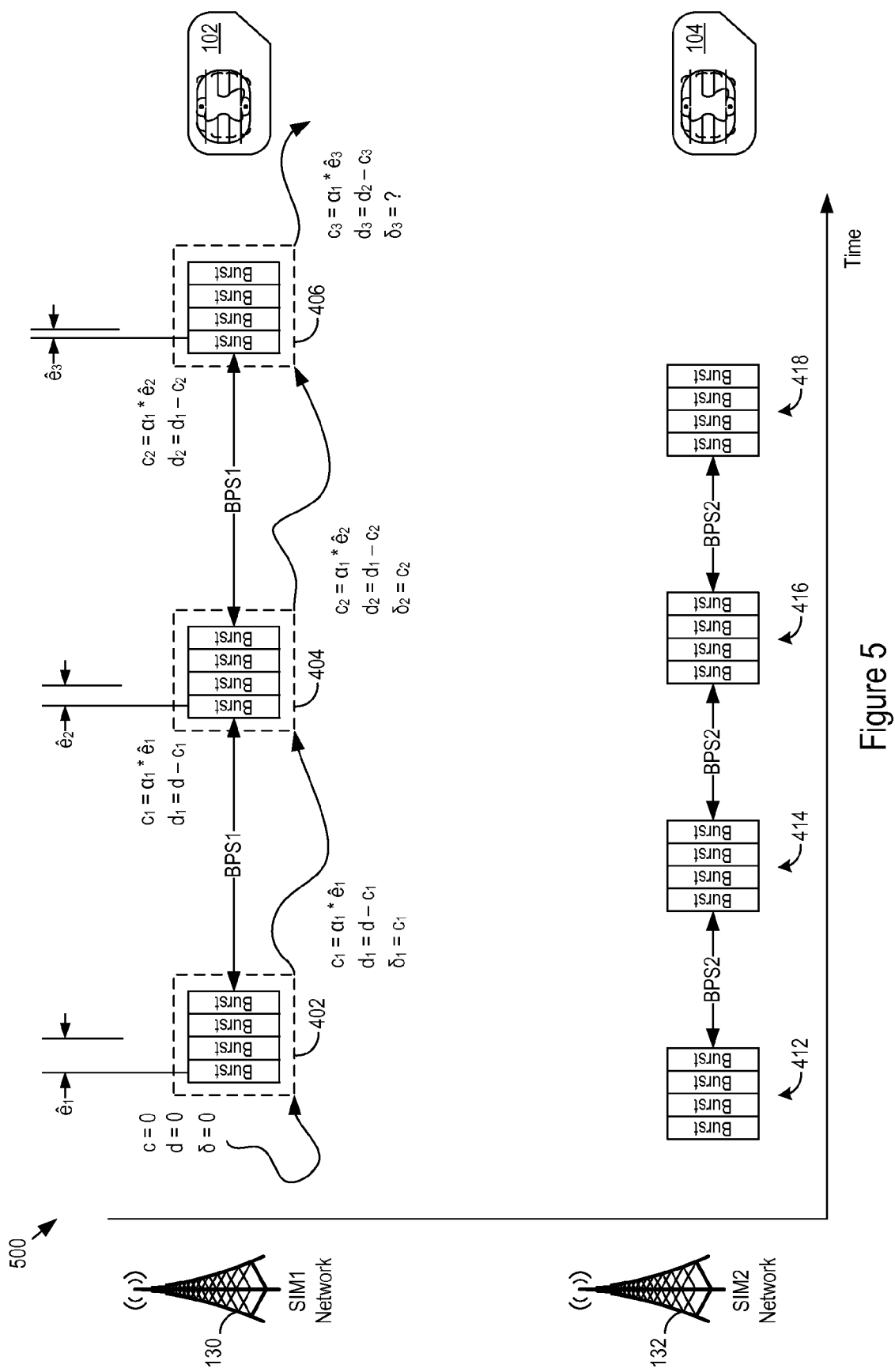
FIG. 5 shows an example an example of user equipment including multiple SIMS where the time tracking logic uses timing information from the paging blocks of SIM1 to update the timing offset.

FIG. 5 shows an example timing graph 500 that includes a series of paging blocks from SIM1 network 130 and SIM2 network 132 that are scheduled for user equipment 100. Because of radio frequency resource sharing, as described above, paging blocks 412, 414, 416, and 418, in this example, are lost due to collisions with paging blocks from SIM1 network 130. User equipment 100 may chose instead to receive paging blocks 402, 404, and 406 from SIM1 network 130. Following timing graph 500 from left to right and using one implementation of time tracking logic 122, user equipment 100 receives paging block 402. Using the midamble of the burst, user equipment 100 determines the timing error between the expected arrival of the midamble and the actual arrival of the midamble of the burst, labeled $\hat{e}_1$. Time tracking logic 122 uses timing error $\hat{e}_1$ and gain factor $\alpha_1$ to determine the loop filter output $c_1$. Time tracking logic 122 updates the differential adjustment factor, $d_1$, subtracting the currently calculated loop filter output $c_1$ from the prior differential adjustment factor, d. Note that time tracking logic 122 subtracts $c_1$ from $d_1$ because user equipment 100 is currently listening to the network with network identification one (i.e., SIM1 network 130). Time tracking logic 122 determines the timing adjustment, $\delta_1$, for the next scheduled paging block using the loop filter output $c_1$. User equipment 100 may use timing adjustment, $\delta_1$, as the compensation factor to apply to internal time base 140 for predicting the expected arrival of the next paging block 404. After user equipment 100 receives and processes paging block 402, it may enter a sleep mode until the next paging block is scheduled to arrive. While in sleep mode, user equipment 100 may use its internal time base 140 along with timing adjustment, $\delta_2$, to predict the expected arrival of the next paging block 404.

When user equipment 100 expects the next scheduled paging block 404, user equipment wakes up from sleep mode to listen for paging block 404. Again, using the midamble of the burst, user equipment 100 determines the timing error between the expected arrival of the midamble and the actual arrival of the midamble of the burst, labeled $\hat{e}_2$. Time tracking logic 122 uses timing error $\hat{e}_2$ and gain factor $\alpha_1$ to determine the loop filter output $c_2$. Time tracking logic 122 updates the differential adjustment factor, $d_2$, subtracting the currently calculated loop filter output $c_2$ from the prior differential adjustment factor, $d_1$. Note that time tracking logic 122 subtracts $c_2$ from $d_1$ because user equipment 100 is currently listening to the network with network identification one (i.e., SIM1 network 130). Time tracking logic 122 determines the timing adjustment, $\delta_2$, for the next scheduled paging block using the loop filter output $c_2$. User equipment 100 may use timing adjustment, $\delta_2$, as the compensation factor to apply to internal time base 140 for predicting the expected arrival of the next paging block 406. After user equipment 100 receives and processes paging block 404, it may enter a sleep mode until the next paging block is scheduled to arrive. While in sleep mode, user equipment 100 may use its internal time base 140 along with timing adjustment, $\delta_2$, to predict the expected arrival of the next paging block 406.

When user equipment 100 expects the next scheduled paging block 406, user equipment 100 wakes up from sleep mode to listen for paging block 406. Again, using the midamble of the burst, user equipment 100 determines the timing error between the expected arrival of the midamble and the actual arrival of the midamble of the burst, labeled $\hat{e}_3$. Time tracking logic 122 uses timing error $\hat{e}_3$ and gain factor $\alpha_1$ to determine the loop filter output $c_3$. Time tracking logic 122 updates the differential adjustment factor, $d_3$, subtracting the currently calculated loop filter output $c_3$ from the prior differential adjustment factor, $d_2$. Note that time tracking logic 122 subtracts $c_3$ from $d_2$ because user equipment 100 is currently listening to the network with network identification one (i.e., SIM1 network 130). Because the timing adjustment, $\delta_3$, for the next scheduled paging block depends on whether the next scheduled paging block will be received on the same network or whether the paging block with be received from another network, the time tracking logic 122 may not determine the timing adjustment for the next paging block until user equipment 100 determines whether the next scheduled paging block will arrive from SIM1 network 130 or SIM2 network 132.

Figure 6:
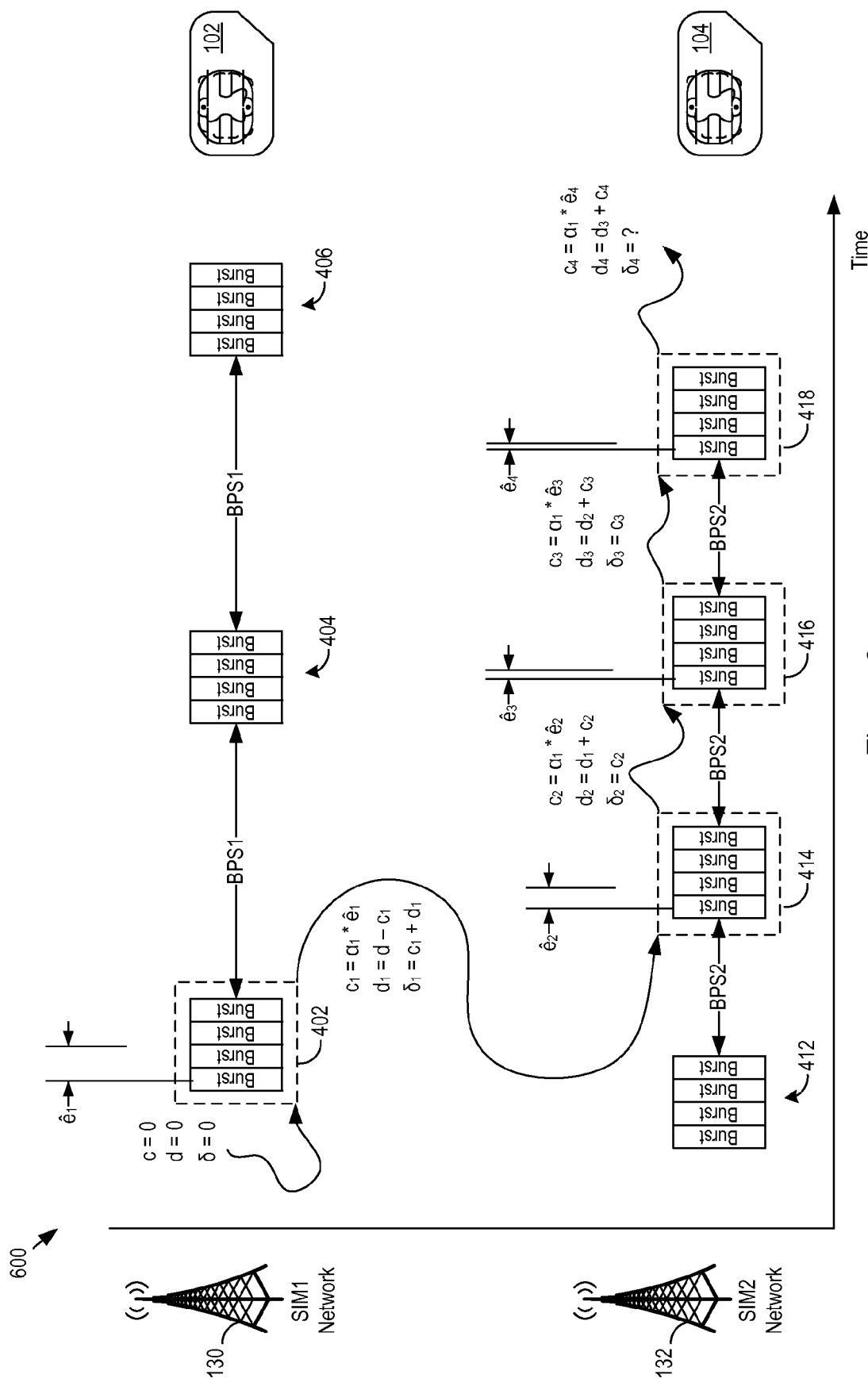
FIG. 6 shows an example an example of user equipment including multiple SIMS where the time tracking logic uses timing information from the paging blocks of SIM1 and SIM2 to update the timing offset.

FIG. 6 shows another example of how the user equipment 100 may use a similar series of paging blocks. Timing graph 600 includes a series of paging blocks from SIM1 network 130 and SIM2 network 132 that are scheduled for user equipment 100. Because of radio frequency resource sharing, as described above, paging blocks 404, 406, and 412, in this example, are lost due to collisions between paging blocks from SIM1 network 130 and SIM2 network 132. User equipment 100 may chose instead to receive paging blocks 402, 414, 416, and 418. Following timing graph 600 from left to right and using one implementation of time tracking logic 122, user equipment 100 receives paging block 402. Using the midamble of the burst, user equipment 100 determines the timing error between the expected arrival of the midamble and the actual arrival of the midamble of the burst, labeled $\hat{e}_1$. Time tracking logic 122 uses timing error $\hat{e}_1$ and gain factor $\alpha_1$ to determine the loop filter output $c_1$. Time tracking logic 122 updates the differential adjustment factor, $d_1$, subtracting the currently calculated loop filter output $c_1$ from the prior differential adjustment factor, d. Note that time tracking logic 122 subtracts $c_1$ from d because user equipment 100 is currently listening to the network with network identification one (i.e., SIM1 network 130). Time tracking logic 122 determines the timing adjustment, $\delta_1$, for the next scheduled paging block using the loop filter output $c_1$ and adds the differential adjustment factor $d_1$. Note that time tracking logic 122 adds $d_1$ because the currently received paging block 402 is from SIM1 network 130 while the next scheduled paging block 414 is from SIM2 network 132. User equipment 100 may use timing adjustment, $\delta_1$, as the compensation factor to apply to internal time base 140 for predicting the expected arrival of the next paging block 414. After user equipment 100 receives and processes paging block 402, it may enter a sleep mode until the next paging block is scheduled to arrive. While in sleep mode, user equipment 100 may use its internal time base 140 along with timing adjustment, $\delta_1$, to predict the expected arrival of the next paging block 414.

When user equipment 100 expects the next scheduled paging block 414, user equipment wakes up from sleep mode to listen for paging block 414. Again, using the midamble of the burst, user equipment 100 determines the timing error between the expected arrival of the midamble and the actual arrival of the midamble of the burst, labeled $\hat{e}_2$. Time tracking logic 122 uses timing error $\hat{e}_2$ and gain factor $\alpha_1$ to determine the loop filter output $c_2$. Time tracking logic 122 updates the differential adjustment factor, $d_2$, adding the currently calculated loop filter output $c_2$ and the prior differential adjustment factor, $d_1$. Note that time tracking logic 122 adds $c_2$ and $d_1$ because user equipment 100 is currently listening to the network with network identification two (i.e., SIM2 network 132). Time tracking logic 122 determines the timing adjustment, $\delta_2$, for the next scheduled paging block using the loop filter output $c_2$. Note that time tracking logic 122 does not add or subtract $d_2$ because the currently received paging block 414 is from SIM2 network 132 and the next scheduled paging block 416 is also from SIM2 network 132. User equipment 100 may use timing adjustment, $\delta_2$, as the compensation factor to apply to internal time base 140 for predicting the expected arrival of the next paging block 416. After user equipment 100 receives and processes paging block 414, it may enter a sleep mode until the next paging block is scheduled to arrive. While in sleep mode, user equipment 100 may use its internal time base 140 along with timing adjustment, $\delta_2$, to predict the expected arrival of the next paging block 416.

When user equipment 100 expects the next scheduled paging block 416, user equipment wakes up from sleep mode to listen for paging block 416. Again, using the midamble of the burst, user equipment 100 determines the timing error between the expected arrival of the midamble and the actual arrival of the midamble of the burst, labeled $\hat{e}_3$. Time tracking logic 122 uses timing error $\hat{e}_3$ and gain factor $\alpha_1$ to determine the loop filter output $c_3$. Time tracking logic 122 updates the differential adjustment factor, $d_3$, adding the currently calculated loop filter output $c_3$ and the prior differential adjustment factor, $d_2$. Note that time tracking logic 122 adds $c_3$ and $d_2$ because user equipment 100 is currently listening to network identification two (i.e., SIM2 network 132). User equipment 100 may use timing adjustment, $\delta_3$, as the compensation factor to apply to internal time base 140 for predicting the expected arrival of the next paging block 418. After user equipment 100 receives and processes paging block 416, it may enter a sleep mode until the next paging block is scheduled to arrive. While in sleep mode, user equipment 100 may use its internal time base 140 along with timing adjustment, $\delta_3$, to predict the expected arrival of the next paging block 418.

When user equipment 100 expects the next scheduled paging block 418, user equipment wakes up from sleep mode to listen for paging block 418. Again, using the midamble of the burst, user equipment 100 determines the timing error between the expected arrival of the midamble and the actual arrival of the midamble of the burst, labeled $\hat{e}_4$. Time tracking logic 122 uses timing error $\hat{e}_4$ and gain factor $\alpha_1$ to determine the loop filter output $c_4$. Time tracking logic 122 updates the differential adjustment factor, $d_4$, adding the currently calculated loop filter output $c_4$ and the prior differential adjustment factor, $d_3$. Note that time tracking logic 122 adds $c_4$ and $d_3$ because user equipment 100 is currently listening to the network with network identification two (i.e., SIM2 network 132). Because the timing adjustment, $\delta_4$, for the next scheduled paging block depends on whether the next scheduled paging block will be received on the same network or whether the paging block with be received from another network, the time tracking logic 122 may not determine the timing adjustment for the next paging block until user equipment 100 determines whether the next scheduled paging block will arrive from SIM1 network 130 or SIM2 network 132.

Figure 7:
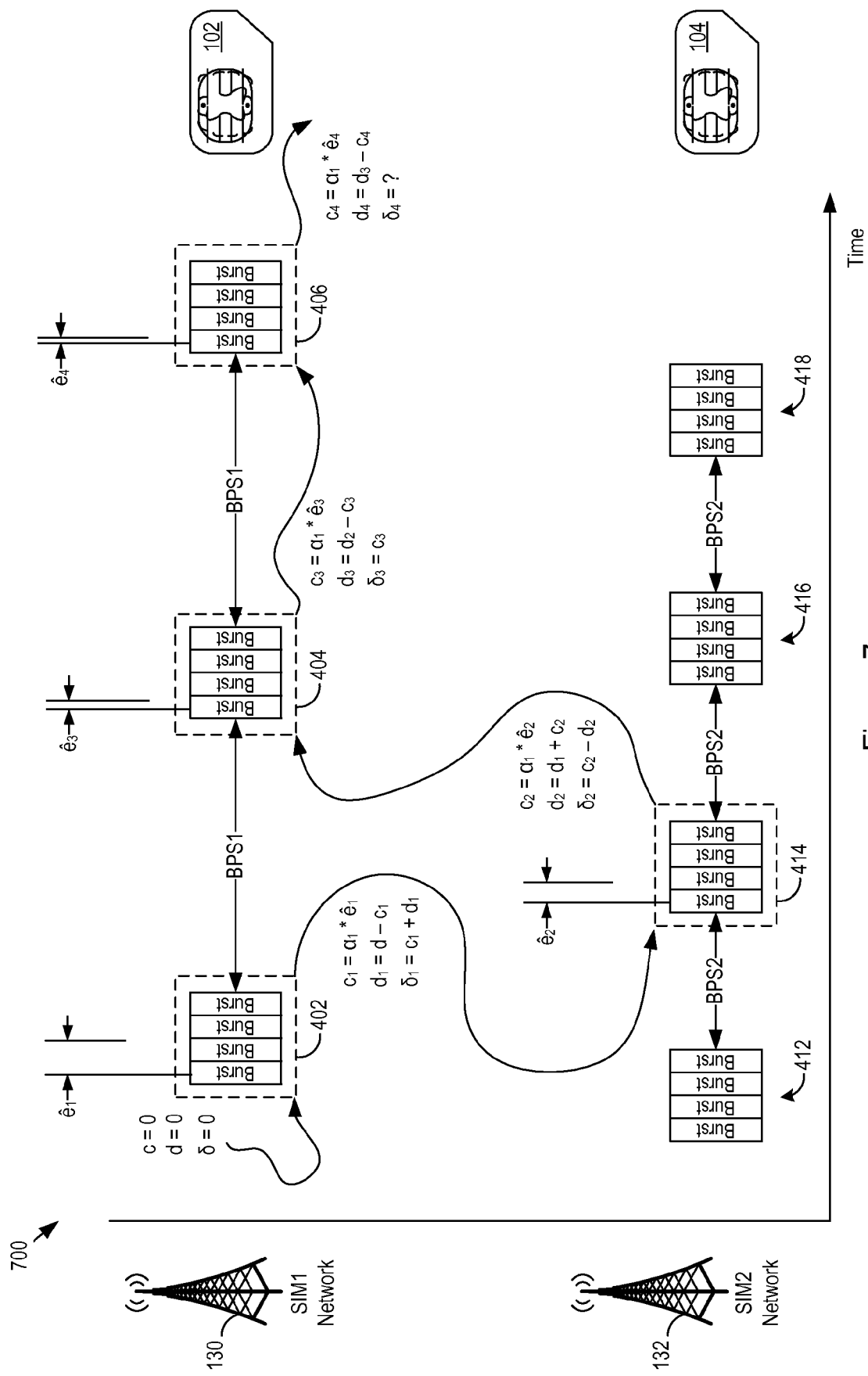
FIG. 7 shows another example an example of user equipment including multiple SIMS where the time tracking logic uses timing information from the paging blocks of SIM1 and SIM2 to update the timing offset.

FIG. 7 shows another example of how the user equipment 100 may use a similar series of paging blocks. Timing graph 700 includes a series of paging blocks from SIM1 network 130 and SIM2 network 132 that are scheduled for user equipment 100. Because of radio frequency resource sharing, as described above, paging blocks 412, 416, and 418, in this example, are lost due to paging blocks collisions between paging blocks from SIM1 network 130 and SIM2 network 132. User equipment 100 may chose instead to receive paging blocks 402, 414, 404, and 406. Following timing graph 700 from left to right and using one implementation of time tracking logic 122, user equipment 100 receives paging block 402. Using the midamble of the burst, user equipment 100 determines the timing error between the expected arrival of the midamble and the actual arrival of the midamble of the burst, labeled $\hat{e}_1$. Time tracking logic 122 uses timing error $\hat{e}_1$ and gain factor $\alpha_1$ to determine the loop filter output $c_1$. Time tracking logic 122 updates the differential adjustment factor, $d_1$, subtracting the currently calculated loop filter output $c_1$ from the prior differential adjustment factor, d. Note that time tracking logic 122 subtracts $c_1$ from d because user equipment 100 is currently listening to the network with network identification one (i.e., SIM1 network 130). Time tracking logic 122 determines the timing adjustment, $\delta_1$, for the next scheduled paging block 414 using the loop filter output $c_1$ and adds the differential adjustment factor $d_1$. Note that time tracking logic 122 adds $d_1$ because the currently received paging block 402 is from SIM1 network 130 while the next scheduled paging block 414 is from SIM2 network 132. User equipment 100 may use timing adjustment, $\delta_1$, as the compensation factor to apply to internal time base 140 for predicting the expected arrival of the next paging block 414. After user equipment 100 receives and processes paging block 402, it may enter a sleep mode until the next paging block is scheduled to arrive. While in sleep mode, user equipment 100 may use its internal time base 140 along with timing adjustment, $\delta_1$, to predict the expected arrival of the next paging block 414.

When user equipment 100 expects the next scheduled paging block 414, user equipment wakes up from sleep mode to listen for paging block 414. Again, using the midamble of the burst, user equipment 100 determines the timing error between the expected arrival of the midamble and the actual arrival of the midamble of the burst, labeled $\hat{e}_2$. Time tracking logic 122 uses timing error $\hat{e}_2$ and gain factor $\alpha_1$ to determine the loop filter output $c_2$. Time tracking logic 122 updates the differential adjustment factor, $d_2$, adds the currently calculated loop filter output $c_2$ and the prior differential adjustment factor, $d_1$. Note that time tracking logic 122 adds $c_2$ and $d_1$ because user equipment 100 is currently listening to the network with network identification two (i.e., SIM2 network 132). Time tracking logic 122 determines the timing adjustment, $\delta_2$, for the next scheduled paging block using the loop filter output $c_2$ and subtracts the differential adjustment factor $d_2$. Note that time tracking logic 122 subtracts $d_2$ because the currently received paging block 414 is from SIM2 network 132 while the next scheduled paging block 404 is from SIM1 network 130. User equipment 100 may use timing adjustment, $\delta_2$, as the compensation factor to apply to internal time base 140 for predicting the expected arrival of the next paging block 404. After user equipment 100 receives and processes paging block 414, it may enter a sleep mode until the next paging block is scheduled to arrive. While in sleep mode, user equipment 100 may use its internal time base 140 along with timing adjustment, $\delta_2$, to predict the expected arrival of the next paging block 404.

When user equipment 100 expects the next scheduled paging block 404, user equipment wakes up from sleep mode to listen for paging block 404. Again, using the midamble of the burst, user equipment 100 determines the timing error between the expected arrival of the midamble and the actual arrival of the midamble of the burst, labeled $\hat{e}_3$. Time tracking logic 122 uses timing error $\hat{e}_3$ and gain factor $\alpha_1$ to determine the loop filter output $c_3$. Time tracking logic 122 updates the differential adjustment factor, $d_3$, subtracting the currently calculated loop filter output $c_3$ from the prior differential adjustment factor, $d_2$. Note that time tracking logic 122 subtracts $c_3$ from $d_2$ because user equipment 100 is currently listening to the network with network identification one (i.e., SIM1 network 130). Time tracking logic 122 determines the timing adjustment, $\delta_3$, for the next scheduled paging block using the loop filter output $c_3$. Note that time tracking logic 122 does not add or subtract $d_3$ because the currently received paging block 404 is from SIM1 network 130 and the next scheduled paging block 406 is also from SIM1 network 130. User equipment 100 may use timing adjustment, $\delta_3$, as the compensation factor to apply to internal time base 140 for predicting the expected arrival of the next paging block 406. After user equipment 100 receives and processes paging block 404, it may enter a sleep mode until the next paging block is scheduled to arrive. While in sleep mode, user equipment 100 may use its internal time base 140 along with timing adjustment, $\delta_3$, to predict the expected arrival of the next paging block 406.

When user equipment 100 expects the next scheduled paging block 406, user equipment wakes up from sleep mode to listen for paging block 406. Again, using the midamble of the burst, user equipment 100 determines the timing error between the expected arrival of the midamble and the actual arrival of the midamble of the burst, labeled $\hat{e}_4$. Time tracking logic 122 uses timing error $\hat{e}_4$ and gain factor $\alpha_1$ to determine the loop filter output $c_4$. Time tracking logic 122 updates the differential adjustment factor, $d_4$, subtracting the currently calculated loop filter output $c_4$ from the prior differential adjustment factor, $d_3$. Note that time tracking logic 122 subtracts $c_4$ from $d_3$ because user equipment 100 is currently listening to the network with network identification one (i.e., SIM1 network 130). Because the timing adjustment, $\delta_4$, for the next scheduled paging block depends on whether the next scheduled paging block will be received on the same network or whether the paging block with be received from another network, the time tracking logic 122 may not determine the timing adjustment for the next paging block until user equipment 100 determines whether the next scheduled paging block will arrive from SIM1 network 130 or SIM2 network 132.

Figure 8:
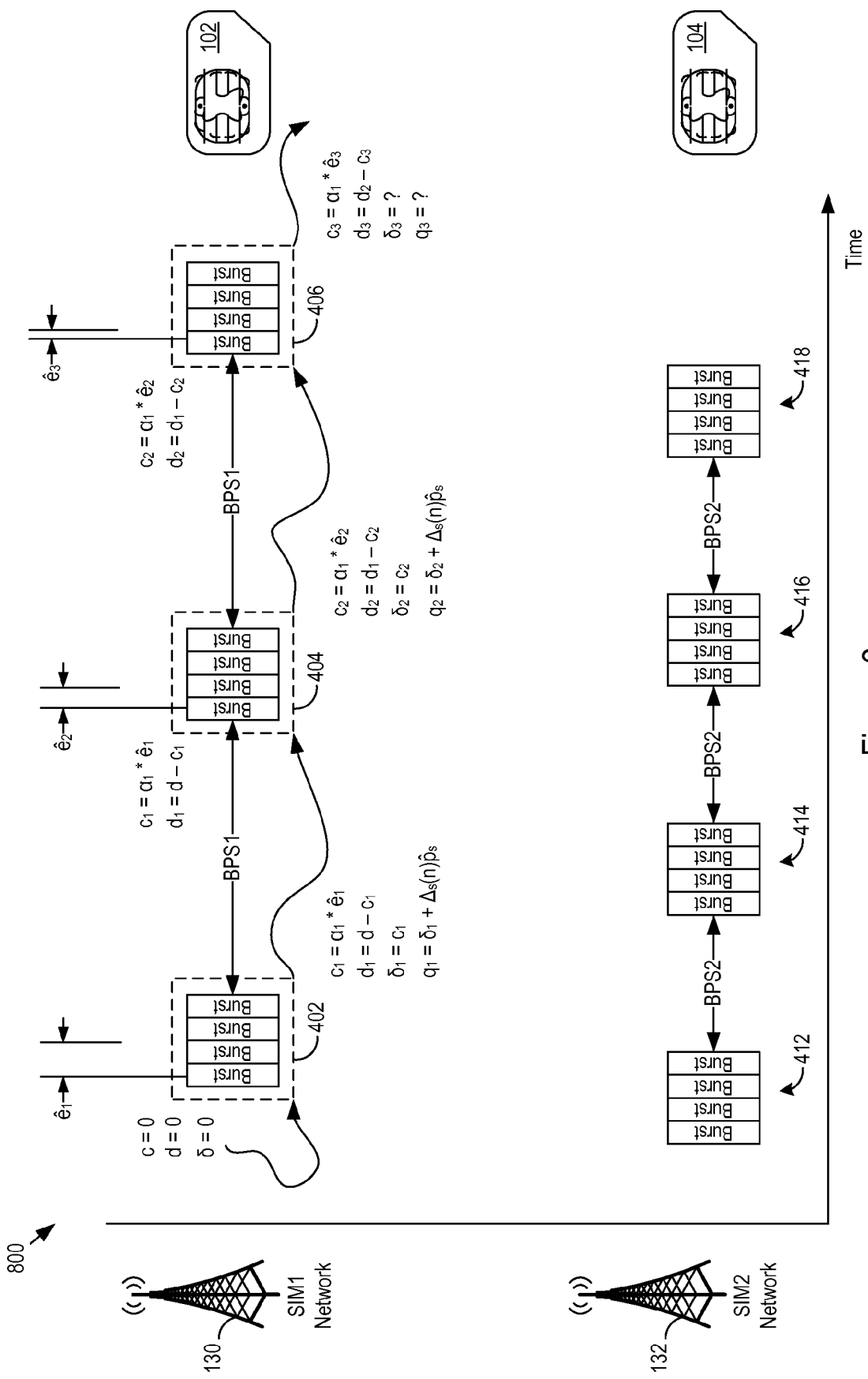
FIG. 8 shows another example an example of user equipment including multiple SIMS where the time tracking logic uses timing information from the paging blocks of SIM1 to update the timing offset.

As shown through FIGS. 6-8, time tracking logic 122 may use paging blocks from either SIM1 network 130 or SIM2 network 132 to compensate for the phase timing error of the internal time base 140, even if the paging blocks collide. In some implementations, the time tracking logic 122 may also compensate for the frequency timing error due to the frequency drift of the internal time base. The frequency timing error may be used in addition to the phase timing error to compensate the internal time base when user equipment 100 predicts the arrival of the next paging block.

In such an implementation, example time tracking parameters 128 may include:

TABLE 3

| Variable | Parameter Type | Description |
| --- | --- | --- |
| $\alpha_1$ | constant | Gain of the first order phase locked loop. This constant may be used to stabilize the loop and may be set to a rational number less than one |

TABLE 3-continued

| Variable | Parameter Type | Description |
| --- | --- | --- |
| $\alpha_d$ | constant | Gain of the "delta loop." This constant may be used to stabilize the loop and may be set to a rational number less than one |
| $\alpha_p$ | constant | Gain of internal time base drift. This constant may be used to stabilize the updates to the internal time base drift and may be set to a rational number less than one |
| L | constant | Length (in time) of the averaging window used in estimating the internal time base drift |
| n | index | An index representing receipt of the current paging block; n + 1 is the next scheduled paging block |
| i(n) | input | Network Identification (e.g., SIM1 network or SIM2 network) for the n-th paging block |
| $\hat{e}$(n) | input | The measured timing error from the n-th paging block |
| $\Delta_s$(n) | input | Time since last paging block was received |
| c | internal state variable | First order loop filter output |
| d | internal state variable | The differential adjustment applied when the next scheduled paging block is from a different network |
| $\hat{p}_s$ | internal state variable | Estimated drift rate of the internal time base (in Hertz) |
| $\delta$ | internal variable | Timing adjustment between the previous paging block and the current paging block |
| $S_{\Delta, i}$ i = 1, 2 | internal state variable | Cumulative counts of the internal time base |
| $S_{\delta, i}$ i = 1, 2 | internal state variable | Cumulative timing adjustments |
| q | output | Time base adjustment for the next paging block |

Using the time tracking parameters 128 listed above, the time tracking logic 122 may implement the following algorithm:

TABLE 4 for n = 1,2, ...
  % calculate loop filter output (phase error timing adjustment)
  c = $\alpha_1 \hat{e}$(n);
  % update differential adjustment
  d = d + (−1)$^{i(n)}$ $\alpha_d$c;
  % determine time base adjustment based on phase timing error
  if              i(n + 1) == i(n)      then    $\delta$ = c ;
  elseif        i(n + 1) == 1        then    $\delta$ = c − d;
  elseif        i(n + 1) == 2        then    $\delta$ = c + d;
  end
  % determine time base adjustment based on phase timing error
  % and timing error due to frequency drift of the internal time base
  q = $\delta$ + $\Delta_s$ (n) $\hat{p}_s$
  % update frequency timing offset parameters
  $S_{\Delta,1}$ = $S_{\Delta,1}$ + $\Delta_s$ (n) ;
  $S_{\Delta,2}$ = $S_{\Delta,2}$ + $\Delta_s$ (n);
  $S_{\delta,1}$ = $S_{\delta,1}$ + $\delta$;
  $S_{\delta,2}$ = $S_{\delta,2}$ + $\delta$;
  if          $S_{\Delta,i(n)}$ > L   then
      % estimate internal time base frequency drift
      $\hat{p}_s$ = $\hat{p}_s$ + $\alpha_p S_{\delta,i(n)}$ (n)/L ;
      $S_{\Delta,i(n)}$ = 0 ;
      $S_{\delta,i}$ = 0;
  end
end In one implementation using the above parameters and algorithm, time tracking logic 122, in addition to determining the time base adjustment due to phase timing error, time tracking logic 122 may include an adjustment due to the frequency drift of the internal time base. Time tracking logic 122 may estimate the time base adjustment due to the frequency drift of the internal time base by multiplying the estimated internal time base frequency drift, $\hat{p}_s$, by the time elapsed since the last paging block was received, $\Delta_s(n)$. The internal time base frequency drift, $\hat{p}_s$, may be estimated over a series of paging blocks using an averaging window, L. Time tracking logic 122 accumulates the actual time elapsed, $S_A$, between reception of paging blocks and accumulates the accumulated phase timing error, $S_\delta$. Each time the actual time elapsed, $S_A$, exceeds the length of the averaging window, L, the time tracking logic 122 may update the estimated internal time base frequency drift, $\hat{p}_s$. Time tracking logic 122 may update the estimated internal time base frequency drift, $\hat{p}_s$, by the estimated frequency error, calculated by a gain constant, $\alpha_p$, multiplied by the accumulated phase timing error, $S_\delta$, divided by the length of the averaging window, L. In addition, the time tracking logic 122 may accumulate the actual time elapsed between reception of paging blocks and accumulate the accumulated phase timing error for each SIM independently.

Figure 9:
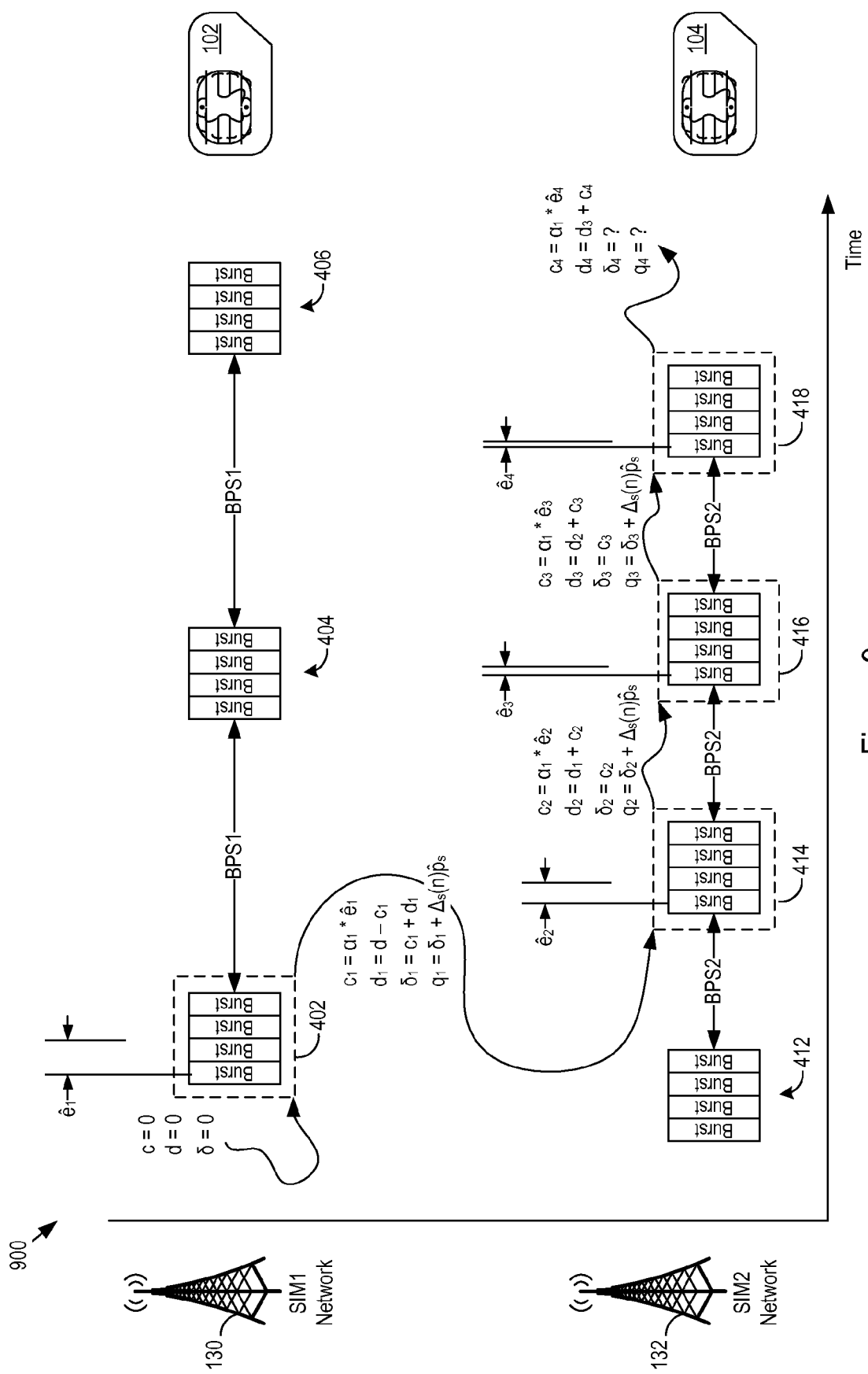
FIG. 9 shows an example an example of user equipment including multiple SIMS where the time tracking logic uses timing information from the paging blocks of SIM1 and SIM2 to update the timing offset.
Figure 10:
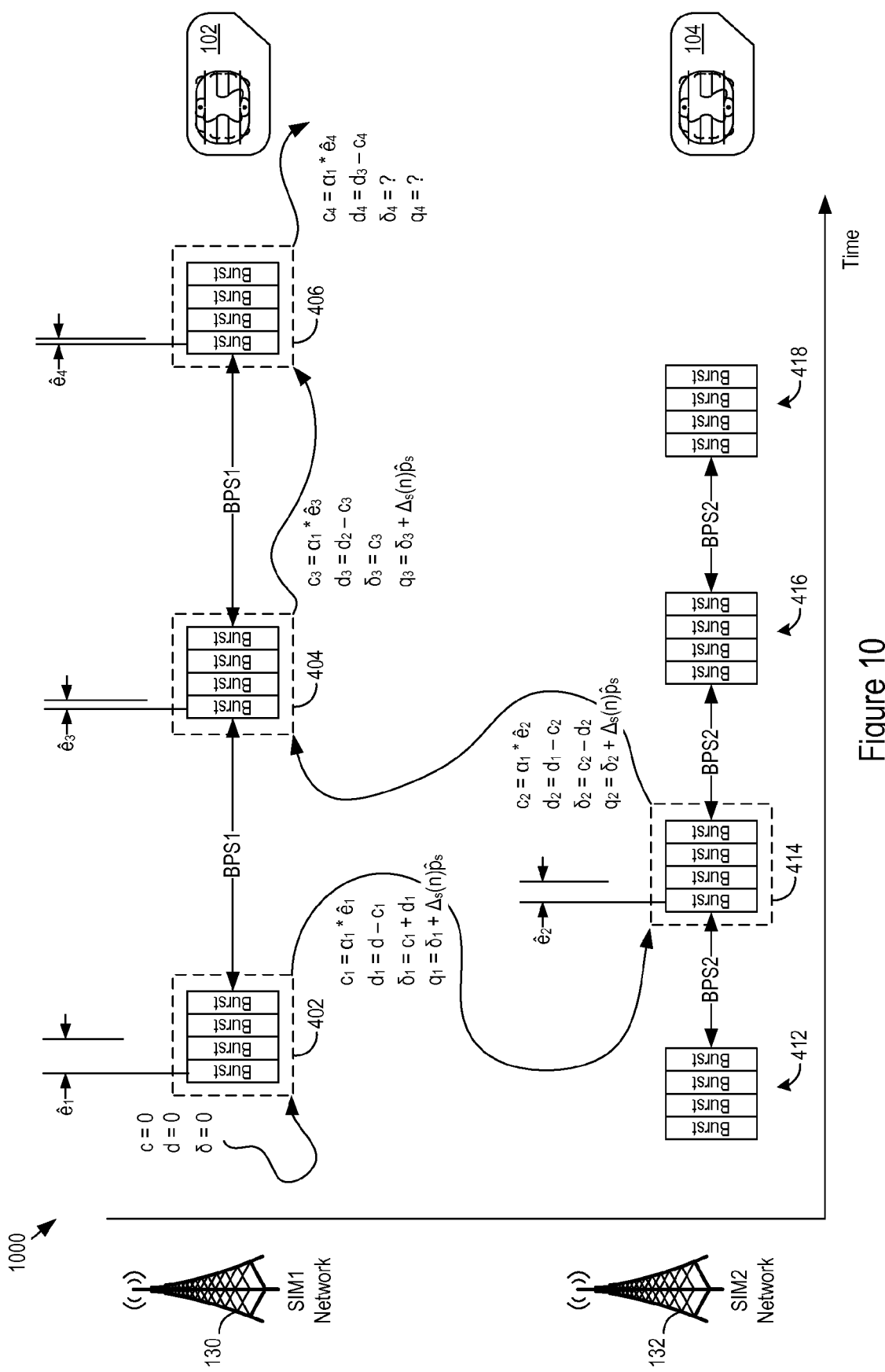
FIG. 10 shows another example an example of user equipment including multiple SIMS where the time tracking logic uses timing information from the paging blocks of SIM1 and SIM2 to update the timing offset.

FIGS. 8-10 are similar in aspects to FIGS. 5-7. As discussed above, the time tracking logic 122 may use paging blocks from either SIM1 network 130 or SIM2 network 132 to compensate for the phase timing error of the internal time base 140, even if the paging blocks collide, and even if the paging blocks arrive from different SIM networks. For each reception of the paging block, time tracking logic 122 may calculate, ê, c, d, and δ in the same way as described above for FIGS. 5-7. However, rather than using δ as the compensation factor to apply to internal time base 140 for predicting the expected arrival of the next paging block, the time tracking logic 122 may use timing compensation q, as shown in FIGS. 8-10. Timing compensation q includes the compensation factor for the phase timing error and differential offset, δ, as described above, and an additional compensation factor for the timing error from the frequency drift $\Delta_s(n)\hat{p}_s$ of the internal time base.

Figure 11:
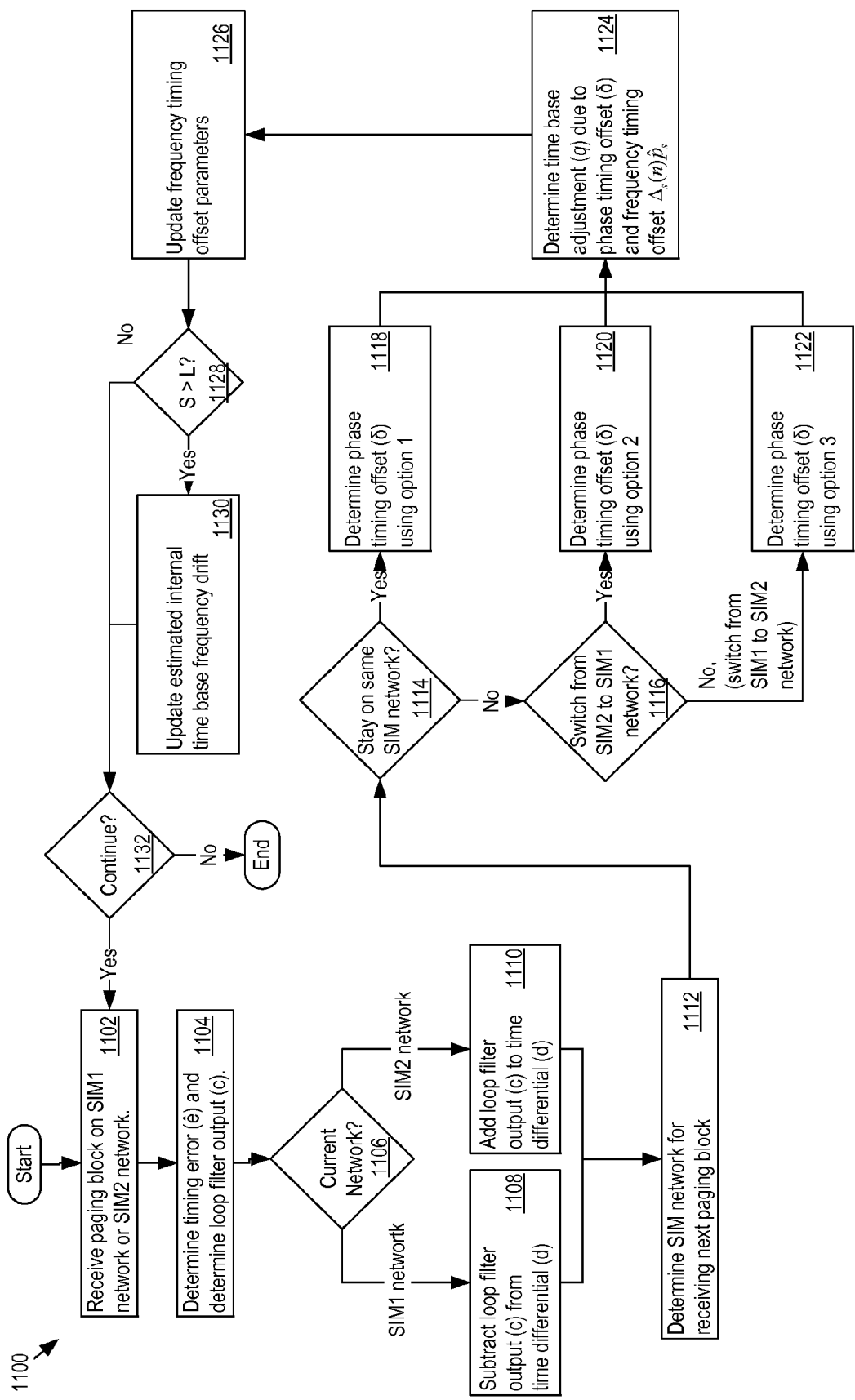
FIG. 11 shows an example of a flow diagram of time tracking logic that user equipment may implement in hardware, software, or both.

FIG. 11 shows flow diagram 1100 and is one implementation of the time tracking logic 122. User equipment 100 receives a paging block on SIM1 network 130 or SIM2 network 132 (1102) and processes the paging block to determine the timing error, ê(n), between the expected arrival of the paging block and the actual arrival of the paging block (1104). Next, time tracking logic 122 determines whether the current network is SIM1 network 130 or SIM2 network 132 (1106). If the current network is SIM1 network 130, timing differential, d, is updated by subtracting the loop output, $c=\alpha_1 ê(n)$, from the prior timing differential (1108). If the current network is SIM2 network 132, timing differential, d, is updated by adding the loop output, $c=\alpha_1 ê(n)$, and the prior timing differential (1110).

Next, the time tracking logic 122 determines which SIM network will receive the next paging block (1112). At block 1114, if the next paging block is on the same network, the timing offset is determined using option 1 (1118). If the time tracking logic 122 uses option 1, the timing offset is set to the phase timing error from the loop output, $\delta=c=\alpha_1 ê(n)$, and does not account for the timing differential, d. On the other hand if, at block 1116, the next paging block switches from SIM2 to SIM1, then the timing offset is determined using option 2 (1120). If the time tracking logic 122 uses option 2, the timing offset is set to the phase timing error from the loop output and subtracts the timing differential, d, between SIM2 and SIM1. Thus, $\delta=c-\alpha_d d$. On the other hand if, at block 1116, the next paging block switches from SIM1 to SIM2, then the timing offset is determined using option 3 (1122). If the time tracking logic 122 uses option 3, the timing offset is set to the phase timing error from the loop output and adds the timing differential, d, between SIM1 and SIM2. Thus, $\delta=c+\alpha_d d$.

Next, the time tracking logic 122 determines the time base adjustment, q, which takes into account the phase timing error, the timing differential, and the frequency timing offset (1124). $q=\delta+\Delta_s(n)\hat{p}_s$. User equipment 100 may use q as the compensation factor for adjusting the internal time base 140 when predicting the timing of the next scheduled paging block. Next, time tracking logic 122 accumulates the actual time elapsed, $S_A$, between reception of paging blocks and accumulates the accumulated phase timing error, $S_\delta$ (1126). At block 1128, time tracking logic 122 determines whether the actual time elapsed, $S_A$, exceeds the length of the averaging window, L. If the actual time elapsed, $S_A$, exceeds the length of the averaging window, L, the time tracking logic 122 may update the estimated internal time base frequency drift, $\hat{p}_s$ (1130). In block 1132, the time tracking logic 122 determines whether to continue listening for the next paging block.

The methods, devices, techniques, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
changing from a first network active mode to a first network idle mode for a first subscriber identity module (SIM) network connection;
while in the first network idle mode, compensating for inaccuracy in an idle mode time base, where the idle mode time base is less accurate than an active mode time base, by:
determining a first phase timing error for the first SIM network connection;
determining a second phase timing error for a second SIM network connection;
combining the first and second phase timing errors to determine a timing error adjustment for the idle mode time base; and
adjusting the idle mode time base by the timing error adjustment.

2. The method of claim 1, further comprising:
compensating for inaccuracy in the idle mode time base while in the first network idle mode, and while in a second network idle mode for a second SIM network connection.

3. The method of claim 1, where determining the first phase timing error comprises:
accessing the first SIM network connection to receive a paging block on the first SIM network connection.

4. The method of claim 3, where the first phase timing error is determined from bits in a burst of the paging block received on the first SIM network connection.

5. The method of claim 1, where determining the second phase timing error for comprises:
accessing the second SIM network connection to receive a paging block received on the second SIM network connection.

6. The method of claim 5, where the second phase timing error is determined from bits in a burst of the paging block received on the second SIM network connection.

7. The method of claim 1, further comprising:
determining a first frequency timing error for the first SIM network connection;
determining a second frequency timing error for the second SIM network connection; and
combining the first and second frequency timing errors with the first and second phase timing errors to determine the timing error adjustment.

8. A system comprising:
a radio frequency communication interface comprising:
a time base; and
system circuitry in communication with the radio frequency communication interface and the time base, the system circuitry configured to:
obtain a first phase timing error for a first subscriber identity module (SIM) network connection;
obtain a second phase timing error for a second SIM network connection;
combine the first phase timing error with the second phase timing error to determine a timing error adjustment; and
adjusting the time base by the timing error adjustment.

9. The system of claim 8, where the system circuitry is further configured to:
obtain the first phase timing error while in a first network idle mode on the first SIM network connection, and
obtain the second phase timing error while in a second network idle mode on the second SIM network connection.

10. The system of claim 8, where the system circuitry is configured to obtain the first phase timing error from a paging block received on the first SIM network connection.

11. The system of claim 10, where the system circuitry is further configured to obtain the first phase timing error from synchronization midamble bits embedded in the paging block received on the first SIM network connection.

12. The system of claim 8, where the system circuitry is further configured to obtain the second phase timing error from a paging block received on the second SIM network connection.

13. The system of claim 12, where system circuitry is further configured to obtain the second phase timing error from synchronization midamble bits embedded in the paging block received on the second SIM network connection.

14. The system of claim 8, wherein the system circuitry is further configured to:
determine a first frequency timing error for the first SIM network connection;
determine a second frequency timing error for the second SIM network connection; and
combine the first and second frequency timing errors with the first and second phase timing errors to determine the timing error adjustment.

15. A radio frequency communication interface comprising:
a time base for a first subscriber identity module (SIM) network connection, the time base comprising a crystal oscillator connected to a timing compensation loop, where the first SIM network connection is in idle mode;
a second SIM network connection in idle mode;
a processor and a memory comprising time tracking circuitry operable to:
receive timing information from the first SIM network connection;
receive timing information from the second SIM network connection;
determine a first phase timing error between the time base and the timing information from the first SIM network connection;
determine a second phase timing error between the time base and the timing information from the second SIM network connection;
combine the first phase timing error and the second phase timing error to determine a phase timing error adjustment for the time base; and
compensate the time base with a time base adjustment that includes the phase timing error adjustment.

16. The interface of claim 15, where the circuitry is further operable to:
generate a first filter output from the first phase timing error;
generate a second filter output from the second phase timing error; and
where:
the phase timing error adjustment is obtained from both the filter outputs.

17. The interface of claim 15, where the circuitry is further operable to:
determine the time base adjustment from the phase timing error adjustment and a frequency timing error.

18. The interface of claim 15, where the circuitry is further operable to:
determine the time base adjustment from the phase timing error adjustment and a filter output determined from the first phase timing error.

19. The interface of claim 15, where the circuitry is further operable to:
   determine the time base adjustment from phase timing error adjustment and a first filter output determined from the first phase timing error and a second filter output determined from the second phase timing error.

20. The interface of claim 15, where the circuitry is further operable to:
   determine the time base adjustment from the phase timing error adjustment and a first filter output determined from the first phase timing error and a second filter output determined from the second phase timing error and a frequency timing error.

* * * * *